Patented Feb. 26, 1935

1,992,615

UNITED STATES PATENT OFFICE 1,992,615

AMINO NITRILE AND PROCESS OF PRODUCING SAME

Ulrich Hoffmann and Bernhard Jacobi, Ludwigshafen-on-the-Rhine, Germany, assignors to I. G. Farbenindustrie Aktiengesellschaft, Frankfort-on-the-Main, Germany No Drawing. Application August 11, 1932, Serial No. 628,362. In Germany September 10, 1931

6 Claims. (Cl. 260—99.30)

The present invention relates to the production of amino compounds.

We have found that valuable amino compounds are obtained by causing $\alpha,\beta$-unsaturated nitriles to react with a nitrogen reactive ammonia base, that is an ammonia base which contains at least one hydrogen atom connected to nitrogen, but is free from alkylol groups. Ammonia bases of this nature are for example ammonia, hydroxylamines, hydrazines, aliphatic, hydroaromatic or aromatic primary or secondary amines or polyamines of the said kind. Specific examples of such bases are ammonia, methyl, ethyl, propyl, butyl, amyl, decyl, dodecyl, octadecyl and cyclohexyl amines, aniline, mono-methyl, -ethyl, -propyl or -butyl anilines, hydroxylamine, N- and O-alkyl, -cycloalkyl or -aryl hydroxylamines, hydrazine and N-alkyl, cycloalkyl or aryl hydrazines, di-ethylene triamine, tri-ethylene tetramine and similar polyamines. The said ammonia bases may also contain acid groups such as carboxylic, nitrile, halogen, ester or nitro groups, as for example in amino acetic acid, N-methyl amino acetic acid, aminocarboxylic nitriles, as for example amino-propionic nitrile, whereby di-nitriles may be formed, chlor-ethyl amine, amino-acetic or -propionic esters and nitro-aryl-hydroxyl-amines or -hydrazines.

The reaction may be carried out in the presence of diluents or solvents, such as water, mono- or polyhydric alcohols which are liquid under the conditions of working, ethers such as di-ethyl ether or dioxane, ethers of polyhydric alcohols, such as ethylene glycol mono-alkyl ethers, halogenated aliphatic hydrocarbons, such as chloroform, carbon tetrachloride or ethylene chloride, aliphatic, cycloaliphatic or aromatic hydrocarbons and similar stable and inert organic solvents. Esters, ketones or aldehydes should not be employed since they may undergo reaction with the reaction components. Quantities of the reaction components in excess of the theoretical quantities may, however, also act as solvents or diluents. The reaction often proceeds at temperatures as low as 20° below zero C. but is usually carried out at room temperature or while warming to, say, about 150° C. If the amines are of high molecular weight the temperature may be further increased to say 200° C. but in any case it is kept below the decomposition temperatures of the reaction components. In many cases it is preferable to employ temperatures lying above the boiling point of at least one of the compounds employed; in this case it is advantageous to work in a closed vessel so that the reaction is carried out under pressure. The presence of from neutral to weakly acid reacting condensation catalysts as for example metallic nickel, zinc, cobalt or copper or other metals capable of giving ammoniates, copper salts, such as copper chlorides, copper sulphate or acetate, and salts of ammonia or amines with strong acids, such as the mineral acids, is frequently of advantage for accelerating the reaction. The reaction is preferably carried out in the liquid phase but may also be carried out in the gaseous phase, especially with ammonia or amines of low molecular weight.

The nitriles may be chosen from acrylic or crotonic nitriles, fumaric or maleic di-nitriles, cinnamic nitrile, nitro-cinnamic nitriles and substances furnishing $\alpha,\beta$-unsaturated nitriles on heating, such as allyl cyanide.

The resulting amino compounds in which the amino group is apparently situated in at least $\beta$-position or still more distant position to the -CN group, may be readily reduced to polyamines and the nitrile groups may be saponified, esterified or subjected to other reactions in the usual manner. The amino group is also available for different reactions, as for example with acids, alkylene oxides, alkyl acid chlorides and the like. The products obtainable according to this invention may be employed, inter alia, as intermediates for the production of assistants for the textile and related industries, as solvents, for example for albumen, fibrin, sulphur and the like, or, as indicated in the following examples, as intermediates for other processes.

The following examples will further illustrate the nature of this invention but the invention is not restricted to these examples. The parts are by weight.

Example 1

212 parts of acrylic nitrile are heated in an autoclave with 85 parts of anhydrous liquid ammonia to 90° C. for about 30 minutes. After cooling, the unconverted ammonia is blown off and the reaction product distilled. 35 parts of beta-aminopropionitrile (having a boiling point of from 84° to 86° at 8 millimetres of mercury), 185 parts of imino-di-3-propionitrile having the formula

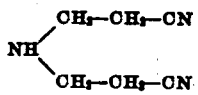

(boiling point from 168° to 170° C. at 3 millimetres of mercury) and 20 parts of a resinous residue are obtained. The imino-di-3-propionitrile may be converted with the aid of ethyl alcohol into imino-di-3-propionic diethyl ester which may be further converted in the usual manner into piperidone (see Journal of the American Society, 53, page 2692 (1931)).

Example 2

212 parts of acrylic nitrile are mixed while cooling to about 10° C. with 292 parts of mono-normal-butylamine; after standing for about 1 hour the mixture is distilled. The normal-butyl-aminopropionitrile ($C_4H_9$—NH—$CH_2$—$CH_2$—CN) thus formed boils at from 114° to 116° C. at 20 millimetres of mercury. The yield is almost quantitative.

126 parts of the resulting normal-butylaminopropionitrile are heated to 100° C. with 40 parts of caustic soda and 200 parts of water. Saponification and consequent dissolution of the substance takes place gradually. As soon as the whole has passed into solution, the whole is evaporated in vacuo. The sodium salt of normal-butylaminopropionic acid is obtained in almost quantitative yield.

212 parts of the normal-butylaminopropionitrile obtained according to the first paragraph of this example together with 100 parts of ether are reduced with hydrogen in an autoclave at 140° C. in the presence of 5 parts of nickel (obtained by heating basic nickel carbonate to 280° C. in a current of hydrogen) and 12 parts of gaseous ammonia. Normal-butylaminopropylamine ($C_4H_9$—NH—$C_3H_6$—$NH_2$) having a boiling point of 60° C. at 1 millimetre (mercury gauge) is obtained in a good yield. The resulting normal-butylamino propylamine may be reacted with oleic acid chloride to give the corresponding oleic amide. The amide thus obtained may be employed as an intermediate for the production of an assistant for the textile and related industries, which may be carried out for example by subsequent sulphonation.

Example 3

53 parts of acrylic nitrile are boiled at 75° C. with 129 parts of di-n-butylamine under a reflux condenser. Di-n-butylaminopropionitrile (having a boiling point of from 140° to 142° C. at 22 millimetres) is obtained in a yield of 64 per cent.

Example 4

99 parts of cyclohexylamine are heated to boiling under a reflux condenser and 53 parts of acrylic nitrile are slowly introduced, the whole then refluxed for an hour. An equilibrium is set up when about 80 per cent consists of cyclohexylaminopropionitrile (having a boiling point of from 149° to 151° C. at 11 millimetres of mercury) and 20 per cent consists of initial material. The latter also enters into reaction to the extent of about 80 per cent after distillation at atmospheric pressure so that the yield of cyclohexylaminopropionitrile is practically quantitative.

Example 5

100 parts of crotonic nitrile are heated at 140° C. for 4 hours with 30 parts of anhydrous ammonia. After cooling and removing remainders of ammonia, amino-3-butyronitrile (having a boiling point of 75° C. at 11 millimetres) is obtained.

Example 6

61 parts of N-ethyl aniline and 27 parts of acrylic nitrile are heated for 4 hours at 180° C. in a closed vessel with an addition of 2 parts of concentrated sulphuric acid. By distilling the reaction product, N-phenyl-N-ethylamino-3-propionitrile having a boiling point of from 175° to 177° C. at 17 millimetres is obtained.

Example 7

80 parts of acrylic nitrile are allowed to flow slowly while cooling to about 10° C. into a freshly prepared solution of hydroxylamine in methyl alcohol neutralized or rendered weakly acid with the aid of hydrochloric acid and which contains 33 parts of hydroxylamine. After allowing to stand for two hours at atmospheric temperature the methanol and unchanged acrylic nitrile are distilled off. The residue consists of a practically quantitative yield of hydroxylamino-N-3-propionitrile (HONH—$CH_2$—$CH_2$—CN). It is a thick liquid which decomposes when distilled even at a few millimetres of mercury. The free base is extremely sensitive to oxidation; it becomes brown in the air.

If the preparation be carried out in an alkaline medium, as for example in the presence of sodium methylate, under otherwise identical conditions to those hereinbefore described, methoxy-3-propionitrile is obtained as well as hydroxylamino-N-3-propionitrile.

Example 8

53 parts of acrylic nitrile are added while cooling well to 58 parts of 57.5 per cent aqueous hydrazine hydrate solution, the water then being removed in vacuo at the lowest possible temperature. By subsequent distillation a condensation product derived from 1 molecular proportion of hydrazine and 1 molecular proportion of acrylic nitrile which boils at from 108° to 112° C. at 4 millimetres, probably hydrazino-3-propionitrile ($NH_2$—NH—$CH_2$—$CH_2$—CN), is obtained in a yield of 90 per cent of the theoretical yield. Small amounts of the corresponding amide ($NH_2$—NH—$CH_2$—$CH_2$—CO—$NH_2$) are also formed.

Example 9

318 parts of acrylic nitrile are allowed to flow slowly through a reflux condenser into 215 parts of triethylenetetramine ($NH_2$—$CH_2$—$CH_2$—NH—$CH_2$—$CH_2$—NH—$CH_2$—$CH_2$—$NH_2$) while stirring. The acrylic nitrile adds on to the tetramine with a strong evolution of heat and with the formation of a viscous liquid.

What we claim is:—

1. The process for the production of aminonitriles which comprises reacting acrylic nitrile with an ammonia base free from alkylol groups but containing at least one hydrogen atom connected to nitrogen.

2. The process for the production of amino nitriles which comprises reacting acrylic nitrile with an organic ammonia base free form alkylol groups but containing at least one hydrogen atom connected to nitrogen.

3. The process for the production of amino nitriles which comprises reacting acrylic nitrile with an amine free from alkylol groups but containing at least one hydrogen atom connected to nitrogen.

4. The process for the production of amino nitriles which comprises reacting acrylic nitrile with an aliphatic amine free from alkylol groups but containing at least one hydrogen atom connected to nitrogen.

5. The process for the production of amino nitriles which comprises reacting acrylic nitrile with an aromatic amine free from alkylol groups but containing at least one hydrogen atom connected to nitrogen.

6. $\beta$-amino-propionitriles in which one of the hydrogen atoms connected to the nitrogen atom of the amino group is substituted by an amino group which latter may be substituted by a hydrocarbon radicle.

ULRICH HOFFMANN.
BERNHARD JACOBI.